United States Patent Office 2,887,334
Patented May 19, 1959

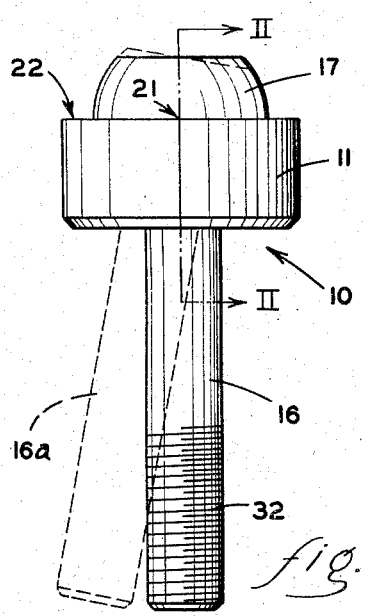
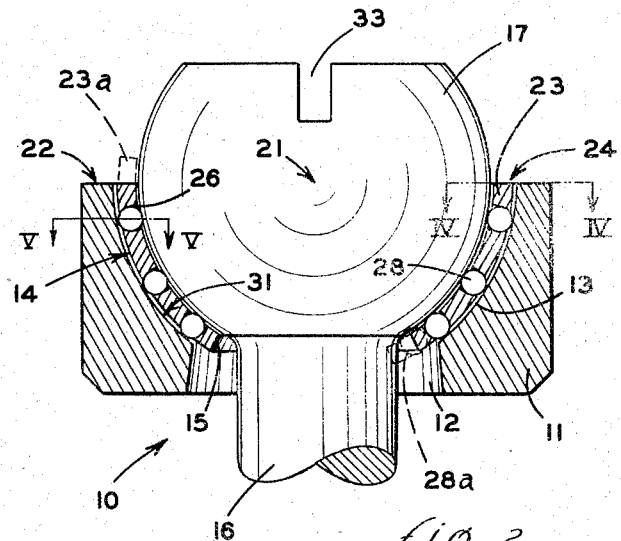
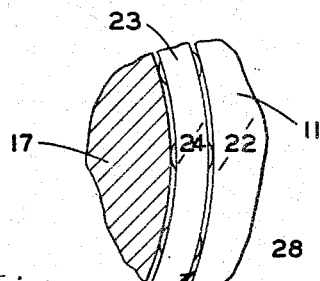
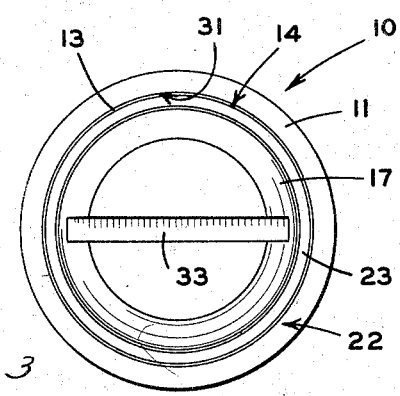
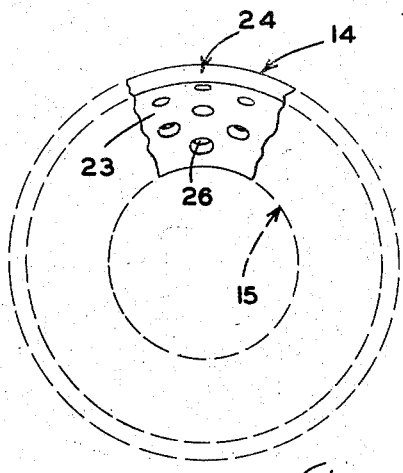
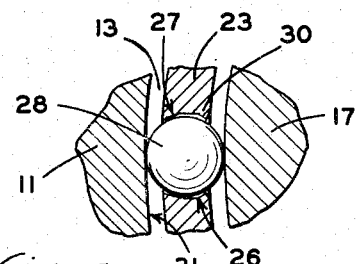

2,887,334

BALL BEARING STRUCTURE

William Lyal Adams, Sr., Bell, Calif., assignor to Industrial Tectonics, Inc., Ann Arbor, Mich., a corporation of Michigan Application September 17, 1956, Serial No. 610,299

2 Claims. (Cl. 287—90)

This invention relates in general to a ball bearing structure and, more particularly, to a type thereof for providing an anti-friction liner between the opposed bearing surfaces of a ball and socket joint.

The use of ball and socket joints, and the augmenting of such joints with ball bearing races, is not new in the field of bearing structures. However, ball and socket joints are normally constructed so that the ball is at least temporarily locked within the socket and the socket must normally be dissembled to remove the ball therefrom. In cases where substantial amounts of thrust or deflection are imposed upon the joint, it has been previously known to provide a conventional anti-friction bearing race between the opposing surfaces of the ball and socket. However, such joints are not normally provided with means for adjusting either the location or the amount of pressure being imposed thereon in order to compensate for minor variations caused by wear or temperature change. Thus, the previously known bearing races tend to groove, and otherwise deface, said opposing surfaces, which results in defective operation.

A ball and socket type of joint is ideally suited in theory to use where it is desired to suspend objects so that they will maintain a relatively constant attitude, even though the means from which they are suspended continues to change its attitude, or vice versa. One example of such requirement is in linkages used with aircraft servo mechanisms. However, presently existing means of adapting a ball and socket joint to this type of application have not been entirely satisfactory because of the above mentioned factors, as well as others. No such suspension structure, insofar as I am aware, has been thus far available where sensitive correction, delicate adjustment, and non-wearing characteristics are required.

Accordingly, a primary object of this invention has been the provision of a ball and socket type of joint, wherein the ball has a force-supporting element extending therefrom through the force-resisting socket; wherein the ball can be quickly and easily removed from the socket; wherein an anti-friction linear, including a plurality of relatively small bearing balls, is disposed between the opposing walls of the ball and socket, thereby reducing excessive wearing and scoring of said opposing walls when under load; and wherein said ball and socket joint will be sensitive to slight variations in the relative attitudes of parts attached to said joint and to the forces acting thereon, and will be capable of accurate and delicate adjustments in the pressure between the opposing surfaces of said ball and socket and the bearing balls located therebetween.

A further object of this invention is the provision of a ball and socket joint, as aforesaid, which is anti-frictional in nature, which is capable of operation under conditions of relatively high temperature, and which permits substantial amounts of contraction and expansion in the sizes of the interacting parts, without impeding in any way the operating efficiency of the joint.

A further object of this invention is the provision of a ball and socket joint, as aforesaid, including anti-friction structure, which is relatively simple to fabricate, extremely simple to assemble, and which can be maintained with a minimum of effort.

Other objects and purposes of this invention will become apparent to persons familiar with this type of equipment upon reading the following specification and examining the accompanying drawings, in which:

Figure 1 is a side elevation of a ball and socket joint, including the anti-friction bearing structure characterizing the invention.

Figure 2 is a sectional view, taken along the line II—II of Figure 1.

Figure 3 is a top plan view of said ball and socket joint structure.

Figure 4 is a sectional view, taken along the line IV—IV of Figure 2.

Figure 5 is a sectional view, taken along the line V—V of Figure 2.

Figure 6 is a partially fragmentary and partially broken, top plan view of the anti-friction liner utilized in the ball and socket joint.

For purposes of convenience in description, the terms "upper," "lower," and derivatives thereof, will have reference to the structure as appearing in Figures 1 and 2. The terms "inner," "outer," and derivatives thereof, will have reference to the geometric center of said structure and parts thereof.

*General description*

As shown in Figures 1, 2 and 3, the ball and socket joint 10, to which this invention relates, is comprised of a bearing block 11 having an opening 12 therethrough. A spherically-shaped recess 13 is also provided in said block 11 at one end of, and communicating with, the opening 12. A spherically-shaped, anti-friction liner 14, having an opening 15 through the center portion thereof, is nested within the recess 13. A pivot element 16 extends through the openings 12 and 15, is laterally movable within said openings, and has an enlarged, spherically-shaped portion 17, hereinafter referred to as the "head," which is receivable into said recess 13 for support by, and movement with respect to, the liner 14. Thus, the pivot element 16 is removably supported by the anti-friction liner 14, which is in turn removably supported by the bearing block 11, whereby said pivot element can move freely and easily about the center of the spherical head 17, within the limits provided by the opening 12 in the block 11. The recess 13 is disclosed as hemispherical, so that the pivot element 16, as well as the liner 14, can be removed from the recess 13 simply by lifting them with respect to the block 11.

*Detailed description*

The bearing block 11, which is fabricated from a durable material, such as hardened steel, may be of any desired size, such as a relatively small annulus, as shown in Figures 1 and 2. In any event, said block is designed to support the weight of whatever device, not shown, is secured to, and suspended from, the lower portion of the pivot element 16, in a manner discussed in detail hereinafter. The spherical recess 13 preferably, but not necessarily, has its center point 21 located within the plane defining the upper surface 22 of the block 11 adjacent to said recess. Thus, said recess 13 does not, in this particular embodiment, normally exceed a hemisphere. The axis of the opening 12 in said block 11 is preferably substantially perpendicular to the said plane defined by said upper surface 22 and preferably passes through the center 21 of the sphere defined by said recess 13. The diameter of the opening 12 is substantially smaller than the maximum diameter of the recess 13 to provide ample support for the liner 14 and pivot element 16, in a manner discussed hereinafter.

The anti-friction liner 14 (Figures 2, 4 and 6) is comprised of a portion of a spherical shell 23, which preferably, but not necessarily, does not exceed a hemisphere, and which preferably has a circular opening 15, which is coaxial with the outer rim 24 of said shell. The outer diameter of the shell 23 is preferably somewhat smaller than the diameter of the recess 13.

The shell 23 is provided, as shown in Figures 2, 5 and 6, with a plurality of uniformly spaced bearing ball openings 26, which are substantially smaller than the central opening 15. Each of said openings 26 has an outwardly converging, conical portion 27. A plurality of bearing balls 28, which are preferably identical, are disposed with one ball in each of said openings 26, said balls having a diameter somewhat larger than the radial thickness of the shell 23. In high precision equipment, as the apparatus of the invention is intended to be, it is very essential that the bearing balls be extremely uniform in size and, further, that the spherical surfaces with which the balls come in contact are as near as possible to being surfaces of true spheres in order to obtain maximum possible uniformity in load distribution. The conical portion 27 of each opening 26 is somewhat smaller in diameter at its outer end than the diameter of said bearing balls 28. Thus, when the bearing balls 28 are placed in the bearing ball openings 26, the conical portions 27 of said openings prevent said bearing balls 28 from going completely through the shell 23. After the bearing balls 28 are installed in the shell 23, the ball openings 26 are preferably staked on the inside of the shell 23, as indicated at 30 (Figure 5), so that the bearing balls will be permanently retained as a part of the liner 14.

The spherical head 17 on the pivot element 16 (Figures 2 and 3) has a diameter which is slightly smaller than the internal diameter of the shell 23. However, the diameters of the bearing balls 28 and of the spherical head 17 are such that the center of the sphere defining the head 17 will be substantially coincidental with the center 21 of the recess 13 when said head 17 is within said recess and spaced from the wall 31 thereof by the bearing balls 28, as appearing in Figure 2. Thus, it will be seen that the spherically-shaped head 17 is supported upon the bearing balls 28 of the anti-friction liner 14, which are in turn supported upon the wall 31 of the recess 13.

The spherical shell 23 serves principally and primarily to maintain the desired spacing between the bearing balls 28. The conical portion 27 of each opening 26 prevents dislodgment of the bearing ball 28a (Figure 2) therefrom when the shell 23 is pivoted, as indicated by broken lines at 23a in Figure 2, into a position where said bearing ball 28a is disposed over the opening 12. Under such circumstances, the pivot element 16 (Figure 1) will be moved into the broken line position 16a.

The lower end of the pivot element 16, which may be a steel rod integral with the spherical head 17, may be threaded at its lower end, as indicated at 32, for the purpose of securing same to any device, not shown, which it is desirable for said device to support or operate. A screw driver slot 33 may be provided, by way of example, in the upper end of the spherically-shaped head 17 for the purpose of adjusting the threaded engagement of the pivot element 16 with that to which it is connected. Under some circumstances, the threads 32 provide for adjustment of the tension imposed on the pivot element 16, hence, the pressure between the head 17 and block 11, which is imposed upon the bearing balls 28.

Operation

Prior to operation of the joint 10, it is assembled by placing the bearing balls 28 in the bearing ball openings 26 of the shell 23, either before or after said shell is placed in the recess 13. The pivot element 16 is then passed through the openings 12 and 15 in the block 11 and the liner 14, respectively, until the spherically-shaped head 17 is within said recess 13 and supported upon the bearing balls 28. The pivot element 16 is then secured, as desired or required, to whatever means it is desired for the joint 10 to engage. The block 11 is mounted upon, or otherwise secured to, a suitable supporting device, according to the circumstances of use of the apparatus. Adjustment of the tension on the pivot element 16 can be effected by means of the threads 32 on said element and the screw driver slot 33. Both the head 17 and the anti-friction liner 14 are movable, both with respect to each other and with respect ot the block 11, about the center point 21. Thus, the pivot element 16 is free to move, with little or no resistance, within the opening 12 and about said center point 21. Accordingly, the pivot element 16 can freely change its attitude with respect to the bearing block 11 within the limitations imposed by the size of the opening 12 in said block 11, without having any material effect upon the attitude of the bearing block 11, even though either or both of said elements are under substantial tension.

For purposes of example, and with no intent to limit the scope of the invention, the following dimensions are offered as illustrative of a completely satisfactory structure built and operated according to the teachings of the invention:

With a head 17 having a diameter of .9081 inch, a recess 13 having a diameter of 1.0643 inches was provided. In such case, the bearing balls 28 having a diameter of .0781 inch were provided and held in a spherical shell 23 having an outside diameter of 1.048 inches, with an inside diameter of .924 inch.

It should be particularly observed that the structure herein provided is capable of undergoing wide temperature changes without adversely affecting its operation, within the limits of the capacity of the metal parts to accept temperature changes without material distortion.

Although a particular, preferred embodiment of the invention has been described hereinabove for illustrative purposes, it will be understood that variations or modifications thereof, which lie within the scope of such disclosure, are fully contemplated unless specifically stated to the contrary in the appended claims.

I claim:

1. A ball and socket anti-friction joint comprising: a bearing block having a hemispherical recess in its upper surface and a relatively large central opening therethrough extending downwardly from said recess; a head member having a hemispherical surface disposed within said recess, said hemispherical surface being of smaller diameter than said recess; a connecting rod of relatively small diameter secured to said head member and extending downwardly through said central opening, said rod being movable through a relatively wide angle laterally of said opening; a hemispherical cup-shaped retainer plate disposed between the wall of said recess and the hemispherical surface of said head member, said retainer plate having a central opening therethrough alignable with the central opening in said bearing block, said connecting rod extending through said central openings in said bearing block and said retaining plate, said central opening in said retainer plate being only slightly larger in diameter than said rod and being substantially smaller than the central opening in said bearing block so that the central portion of said retainer plate overhangs the peripheral portion of said central opening in said bearing block; a plurality of spaced bearing balls in said retainer plate and disposed between said hemispherical surface of said head member and the wall of said recess, said balls being of larger diameter than the thickness of said retainer and being equal to the spacing between the hemispherical surface of said head member and the wall of said recess, said bearing balls supporting said head member and said retainer plate for pivotal movement with respect to said bearing block.

2. A ball and socket anti-friction joint comprising: a bearing block having a hemispherical recess in its upper surface and a relatively large central opening extending therethrough downwardly from said recess; a head member having a hemispherical surface disposed within said recess, said hemispherical surface being of smaller diameter than said recess, said head member also having a slot in its upper surface; a connecting rod of relatively small diameter integral with said head member and extending downwardly through said central opening and being movable through a relatively wide angle laterally of said opening, said rod having a threaded portion at its lower end; a hemispherical cup-shaped retainer plate movably disposed between the wall of said recess and the hemispherical surface of said head member, said retainer plate having a central opening alignable with the central opening in said bearing block, said connecting rod extending through said central openings in said bearing block and said retaining plate, said central opening in said retainer plate being only slightly larger in diameter than said rod and being substantially smaller than the central opening in said bearing block so that the central portion of said retainer plate overhangs the peripheral portion of said central opening in said bearing block, said retainer plate having a plurality of spaced openings extending radially therethrough, said openings being frusto-conical in cross section in the radially outer portion thereof; a bearing ball disposed within each of said openings in said plate, said plate being deformed adjacent the radially inner end of said openings to retain the bearing balls therein, the diameter of each bearing ball being substantially larger than the thickness of said retainer plate and being equal to the spacing between said hemispherical surface and the wall of said recess so that said bearing balls support said retainer plate and said head member for pivotal movement with respect to said bearing block, said balls being positioned so that the innermost ones thereof contact the portions of said bearing block adjacent the edge of the central opening therein when the central opening in said retainer plate is coaxial therewith.

References Cited in the file of this patent

UNITED STATES PATENTS

| | | |
|---|---|---|
| 410,570 | Arnold | Sept. 10, 1889 |
| 1,963,112 | Baker | June 19, 1934 |

FOREIGN PATENTS

| | | |
|---|---|---|
| 402,799 | France | Oct. 16, 1909 |